United States Patent [19]
Decours et al.

[11] 4,024,743
[45] May 24, 1977

[54] SEALING DEVICE FOR AN EXTRUSION PRESS OR A COMPACTING PRESS

[75] Inventors: Jacques Decours, Arpajon; Jean Gavinet, Orsay, both of France

[73] Assignee: Commissariat a l'Energie Atomique, Paris, France

[22] Filed: Oct. 1, 1975

[21] Appl. No.: 618,575

[30] Foreign Application Priority Data
Oct. 8, 1974 France .............................. 74.33851

[52] U.S. Cl. .................... 72/54; 72/273; 92/183
[51] Int. Cl.² ................. B21D 22/10; B21C 25/00
[58] Field of Search ............... 72/54, 273, 63, 56; 92/183, 182, 247

[56] References Cited
UNITED STATES PATENTS

| | | | |
|---|---|---|---|
| 607,077 | 7/1898 | Ramsdell | 92/247 |
| 1,751,445 | 3/1930 | Davis | 92/247 X |
| 2,977,167 | 3/1961 | Barnhart | 92/183 X |

FOREIGN PATENTS OR APPLICATIONS 947,881   8/1956   Germany .............................. 72/273

*Primary Examiner*—Leon Gilden
*Attorney, Agent, or Firm*—Flynn & Frishauf

[57] ABSTRACT

The sealing device comprises two interengaged members forming a clearance space in which is imprisoned a deformable seal for ensuring pressure-tightness between the members and the internal surface of the press chamber. The member which is in contact with the liquid medium under hydrostatic pressure comprises means for establishing pressure equilibrium within the press chamber and within the clearance space immediately after deformation of the seal.

15 Claims, 7 Drawing Figures

SEALING DEVICE FOR AN EXTRUSION PRESS OR A COMPACTING PRESS

FIELD OF INVENTION

This invention relates to a device for providing a pressure-tight seal between the ram and the chamber of a press during hot or cold extrusion of a metal billet or during isostatic compression of a powder, the billet or powder being placed within the chamber with a suitable lubricant and forced under the action of the ram against a calibrated die provided at the opposite end of the chamber with respect to said ram.

BACKGROUND OF THE INVENTION

A known sealing system of this type as disclosed in French Pat. No. 1,6000,889 in the name of Commissariat l'Energie Atomique is capable of operating at high temperature, in particular for the hot extrusion of metal billets. This system consists in providing the ram at that extremity which penetrates into the chamber of the press with two members which interengage with a small clearance and are capable of relative motion along a common axis of application of the thrust load on said members. A seal is imprisoned between said members in the vicinity of the periphery of these latter. One of said members is provided with a projecting annular portion defining a flat bearing surface having a small cross-sectional area which is applied against the seal and extends at right angles to the axis. The other member is provided with a bearing surface for the same seal opposite to the annular portion of the first member and with an inclined face which is also applied against said seal and directed towards the exterior of the member. The force applied by the members to each other under the action of the ram in opposition to the reaction of the billet and of a liquid medium usually consisting of a lubricant which are present within the press chamber results in partial creep of the seal within the clearance formed between the two members and also within the annular space formed between the periphery of said members and the internal surface of the press chamber. This gives rise to a multiplied flattening effort in compression which is higher in value than the thrust or compressive force of the ram in the ratio of the area of the flat bearing surface of the first member to the area of application of the compressive force of the ram on said first member.

The resultant deformation of the seal achieves the necessary degree of pressure-tightness with the internal surface of the press chamber, said pressure-tightness being subsequently maintained continuously throughout the extrusion operation. In particular, since the compressive force on the ram increases rapidly at a uniform rate, flattening of the seal in commpression first takes place in accordance with the above-mentioned process with partial filling of the clearance spaces up to the moment when said force attains a value at which the billet contained within the press chamber which is subjected to the hydrostatic pressure of the lubricant begins to pass through the die. From this moment, the deformation of the seal remains unchanged; it should be noted, however, that the particular configuration of the components of the device and especially the directional force exerted by these latter on the seal as a result of the inclined bearing surface of the second member which is directed outwards makes it possible to absorb the irregularities or defects which are present in the surface of the chamber during extrusion or any variations arising from the thrust of the ram. Since the resultant of the force applied to the seal is in fact of higher value than the force applied to each member, the variations in state of surface or in thrust result only in a deformation or complementary "consumption" of the seal which is sufficient to prevent interruption of pressure-tightness at all times.

Since the difference in time between the initial instant of application of pressuree to the seal and commencement of extrusion of the billet is not negligible, the stage during which deformatiion of the seal takes place between the two imprisoning members is sufficiently long to result in appreciable consumption of the seal which accordingly undergoes creep or plastic flow within the clearance spaces provided for this latter, that is, from the time of inception of the cycle up to the instant of commencement of the extrusion operation. This deformation of the seal is of such magnitude in practice that creep taken place within the space formed between the members and the internal surface of the chamber, not only towards the rear of said members with respect to the direction of displacement of the ram but even in the opposite direction. The overall consumption of the seal is considerable, which practically prohibits its re-use after a first extrusion cycle and the seal therefore has to be changed for each new operation. In point of fact, if the force to be applied to the seal must be capable of causing its plastic deformation at the initial instant in order to ensure positioning between the two compression members both within the space between these latter and the internal surface of the press chamber, this is of course subsequently no longer essential except when taking into account accidental variations in the state of surface or in the thrust or compressive force exerted by the ram as mentioned in the foregoing.

SUMMARY OF THE INVENTION

The present invention relates to an improvement in the arrangements already covered by the prior patent cited earlier. This improvement permits in particular the re-use of the seal a large number of times, this beng achieved by limiting its initial deformation and its consumption, said consumption being restricted to the value which is just necessary in order to attain the requisite degree of pressure-tightness.

To this end, the device under consideraton is characterized in that the member which is in contact with the liquid medium under hydrostatic pressure within the chamber comprises means for achieving pressure equilibrium on the one hand within said chamber and on the other hand within the clearance space formed between the two members, said pressure equilibrium being attained immediately after deformation of the seal which ensures pressure-tightness between the members and the internal surface of the chamber.

Pressure equilibrium on each side of the member which is in contact with the lubricant or the liquid medium within the chamber can be achieved with a predetermined timelag with respect to the initial instant of compression of the seal by means of any suitable system, especially by means of a duct of suitable shape and dimensions provided if necessary with a calibrated control valve. In a preferred embodiment, said means are constituted by a bore formed in the member which is in contact with the liquid medium within the chamber and terminating in a recess respectively for the passage and abutting contact of a stem and of the head of a screw fixed at the extremity remote from the head within an internally-threaded bore of the other member, the stem of the screw and the bore being intended to delimit a narrow annular duct for the upward flow of the liquid medium towards the clearance space between the two members.

BRIEF DESCRIPTION OF THE DRAWINGS

Further properties of a sealing device as constructed in accordance with the invention will become apparent from the following description of a number of exemplified embodiments given by way of indication and not in any limiting sense, reference being made to the accompanying drawings, wherein.

DETAILED DESCRIPTION

Figure 1:
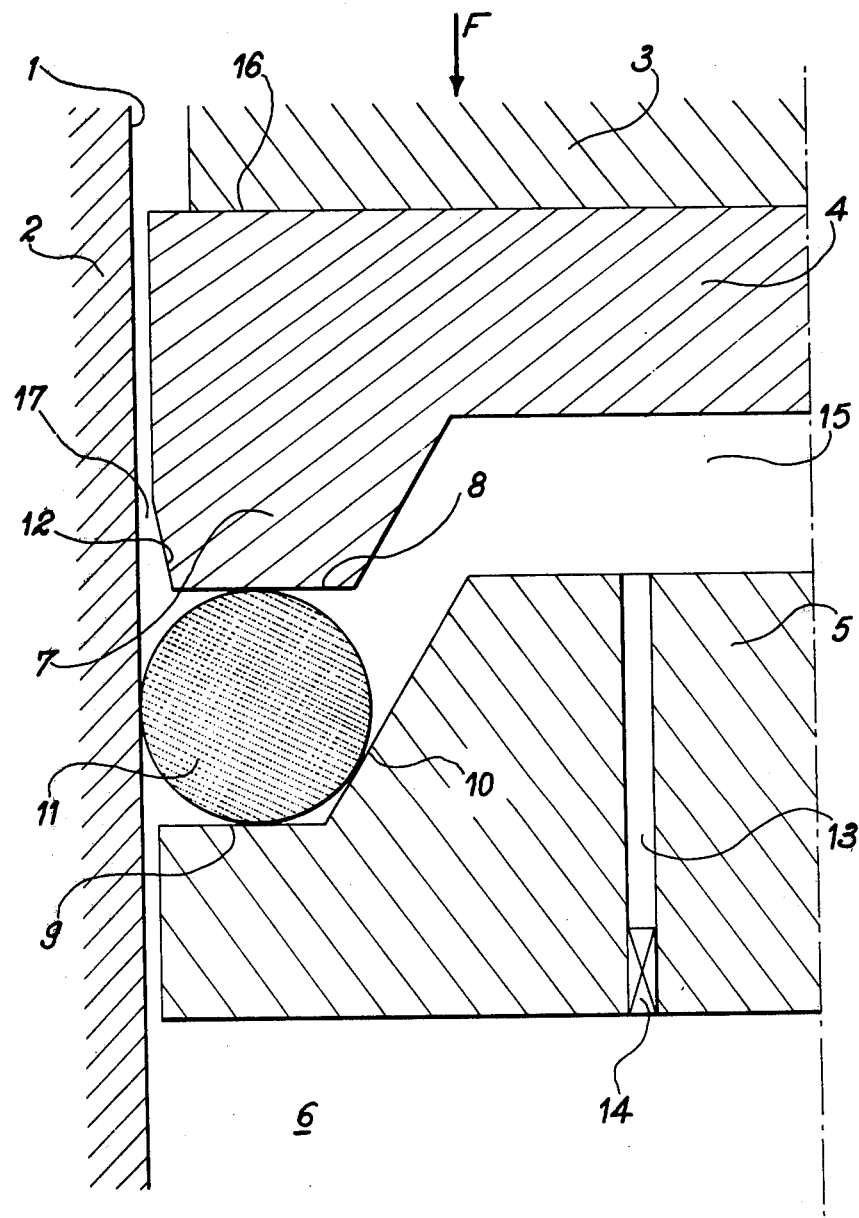
FIG. 1 is a diagrammatic transverse part-sectional view of the device under consideration in which a seal is imprisoned between the two members associated with the ram of an extrusion press, said seal being mounted within the extrusion chamber of the press prior to compression of said seal between said members.

In FIG. 1, the reference 1 designates the internal surface of an extrusion container or chamber 2 of a known type in which a cylindrical ram 3 is slidably mounted but the constructional detail of which has little bearing on the present invention. The extrusion ram is associated with two annular compression members 4 and 5 of generally cylindrical shape which are partially interengaged and define with respect to the interior of the chamber 2 a region 6 in which is placed a billet (not shown in the drawings), said billet being surrounded by a suitable lubricant or powder to be compacted and placed in known manner within a thin-walled casing which contains the powder.

The member 4 which is in contact with the ram 3 has a projecting annular portion 7 on which is formed a flat bearing surface 8 extending at right angles to the common axis of the two members 4 and 5 which coincides wih the axis of the chamber 2 and the direction of displacement of the ram 3 under a thrust applied to this latter. Similarly, the second member 5 which is in contact with the lubricant within the chamber has a flat bearing face 9 formed as a hollowed-out recess and located substantially opposite to the bearing surface 8 of the member 4, said bearing face 9 being extended by a conical face 10. Between the members 4 and 5 is mounted a seal 11 which, in the example of construction under consideration, is designed in the shape of a toric ring having a circular transverse cross-section. Said seal 11 is placed between the members 4 and 5 so as to be applied on the one hand against the bearing surface 8 of the member 4 and on the other hand against the bearing faces 9 and 10 of the member 5. At the time of assembly, the seal 11 is compressed to a slight extent in order to be capable of penetrating into the chamber 2 and to be applied with light pressure against the internal surface 1 of chamber 2. The member 4 is also provided with a conical chamber 12 in the peripheral portion of said member and in the vicinity of the surface 1 of the chamber 2. Finally and in accordance with an essential arrangement of the invention, the second member 5 is provided in the example of construction under consideration with a central duct 13 of small cross-sectional area, said duct being fitted with a calibrated control valve 14 for providing a communication between the region 6 within the interior of the chamber 2 and the relatively narrow gap 15 of the order of 3 to 5 mm which is formed between the members 4 and 5 as a result of the presence of the seal 11.

The various elements of the sealing device having thus been positioned within the extrusion chamber of the press, the operation of the device is as follows: the uniformly increasing force exerted by the ram 3 as represented diagrammatically by the arrow F in FIG. 1 is transmitted to the contacting surface 16 of the member 4 which is assumed to be horizontal while the axis of the press chamber is vertical in the example under consideration. The member 4 in turn transmits said force to the seal 11 by means of the bearing surface 8 of the annular portion 7 which has a smaller-sectional area than the surface 16. Under these conditions, the pressure on the seal is in the ratio of said surfaces. The seal 11 re-transmits the force applied to the member 5 and this latter in turn applies said force by means of the bearing faces 9 and 10 to the lubricant contained in the region 6 within the chamber 2.

During a very short time interval, the member 4 is set in motion towards the member 5 under the action of the ram within the clearance space 15 and compresses the seal 11 under an increasing pressure which is multiplied in the ratio of the surfaces 16 and 8 as aforesaid. This pressure-mulitiplying effect ensures practically immediate deformation and shaping of the seal 11 between the members 4 and 5.

Since the effort exerted by the ram 3 continues to increase, the multiplying effort on the seal 11 also increases, with the result that the plastic deformation of said seal becomes excessive both within the clearance space 15 provided between the two members and within the space 17 between said members and the internal surface 1 of the press chamber 2. In order to limit the consumption of the seal solely to the value reequired for obtaining the necessary degree of pressure-tightness (since it would serve no useful purpose to exceed this value) and consequently in order to extend the lifetime of the seal, the multiplying effect exerted is controlled so as to ensure that this effect appears only at the beginning of the operation so as to cause deformation of the seal in accordance with the process explained earlier, this deformation being subsequently maintained practically without variation. To this end, the calibrated control valve 14 provided within the communication duct 13 of the member 5 is adapted to open under the increase in hydrostatic pressure within the region 6 so as to ensure that the lubricant contained within the press chamber spreads within the clearance space 15, thus equalizing the pressures on each side of the member 5. The seal 11 is then subjected on all its faces except on the side corresponding to the space 17 to the hydrostatic pressure of the lubricant which increases with the compressive force or thrust of the ram 3 to the value at which the extrusion process begins. The member 4 always transmits the effort of the ram to the member 5 by means of the seal 11; however, the presence of lubricant within the space 15 limits the residual deformation of the seal solely to the space 17 between the members and the internal surface 1 of the chamber. Creep deformation of the seal within said space is reduced to its smallest value, especially by virtue of the presence of the conical chamber 12 on the member 4.

Figure 2:
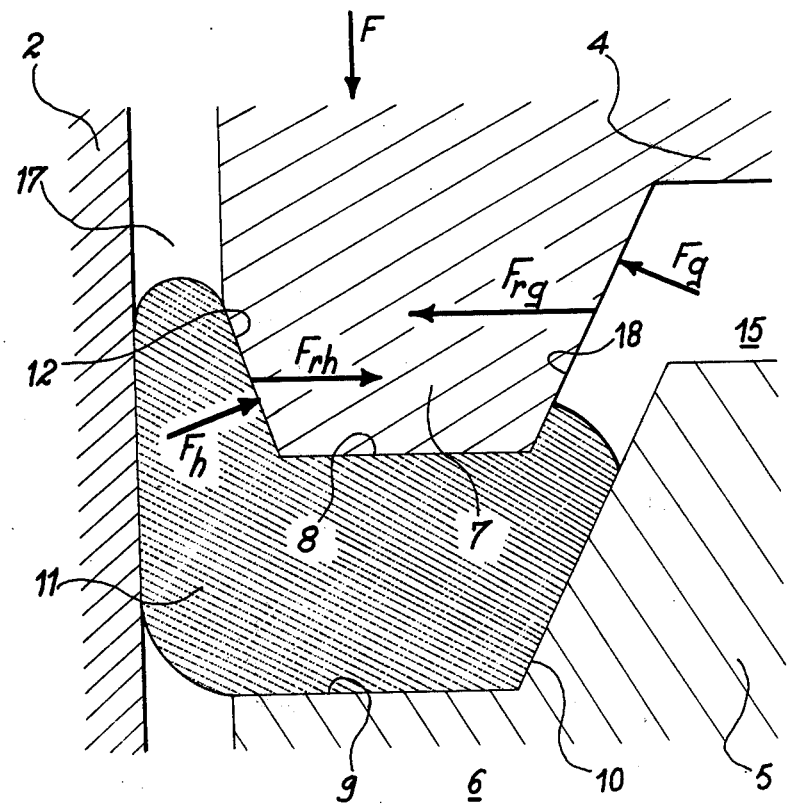
FIG. 2 is a detail view to a larger scale illustrating in particular the shape of the seal after compression.

In fact, whereas the entire surface of the member 5 is subjected after the initial stage to the hydrostatic pressure of the lubricant within the press chamber, the same does not apply to the member 4. As illustrated in particular in the detail view of FIG. 2, the member 4 is subjected to a force Frg, namely the resulant of all the forces Fg applied to the surface 18 which defines the annular portion 7 within the clearance space 15 and on the inclined face of the chamfer 12 to a force Frh which is the resultant of the applied forces Fh. Under these conditions, the object of the chamfer is to ensure that the stresses produced within the seal 11 are transferred within the space 17 to a point which is as high as possible, especially so as to ensure that the force Frg and Frh are substantially equal and opposite and that deformation as well as potential failure of the member 4 in the region of its annular portion 7 are prevented. The choice of the dimensions of the chamfer and the distance between the two inclined planes of the surfaces 12 and 18 makes it possible to come as close as possible to optimum equilibrium, the natural resistance of the member 4 being additionally taken into account.

When the force F exerted on the member 4 by the ram 3 is no longer applied, for example at the end of the extrusion operation, the stresses on the seal 11 are reduced to zero at the same time and the dimensions of the seal are slightly modified as a result of resilient recovery. However, since the seal was previously under pressure over the greater part of its periphery, it retains substantially the shape acquired after initial compression between the members 4 and 5. Said seal can therefore readily be employed again for further extrusion operations whilst the consumption of said seal remains in any case extremely small and limited to the plastic deformation within the very small space 17. In addition, said consumption is considerably limited by the direction of the resultant of the forces acting on the chamfer 12 ; said resultant is directed in the opposite direction and thus acts in opposition to said creep deformation.

The device in accordance with the invention can be carried into effect irrespective of the mode of extrusion adopted or the structure of the press employed; in this latter case, only the orientation and utilization temperature of the seal is adapted to the nature of the material employed.

Figure 3:
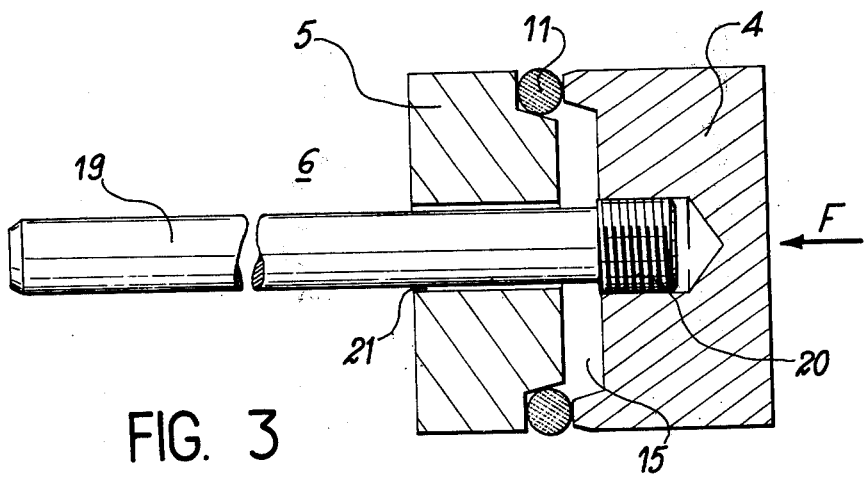
FIG. 3 illustrates an alternative form of construction of the device which is more especially adapted to a press for extruding tubes.

In an alternative embodiment which is illustrated diagrammatically in FIG. 3, the press shown is designed for the production of tubular elements. To this end and in accordance with a conventional arrangement, the member 4 is fitted with an axial pin 19 which is rigidly fixed to the member along the axis of this latter by means of a threaded portion 20. The pin is adapted to pass through the second member 5 by means of a passage 21 with provision for clearance. Said passage can perform directly the function of the communication duct which permits upward flow of the lubricant and equalization of pressures on the one hand within the region 6 and on the other hand within the clearance space 15 between the two members 4 and 5.

Figure 4:
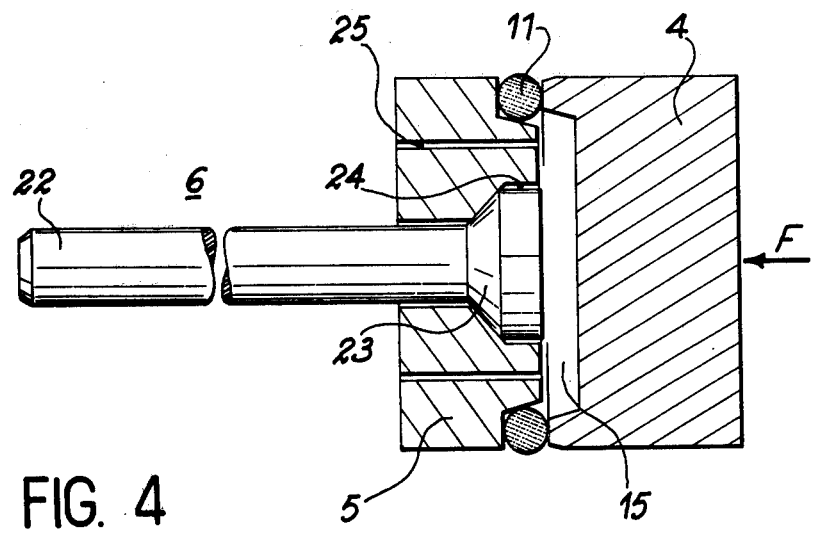
FIG. 4 illustrates another alternative embodiment.
Figure 5:
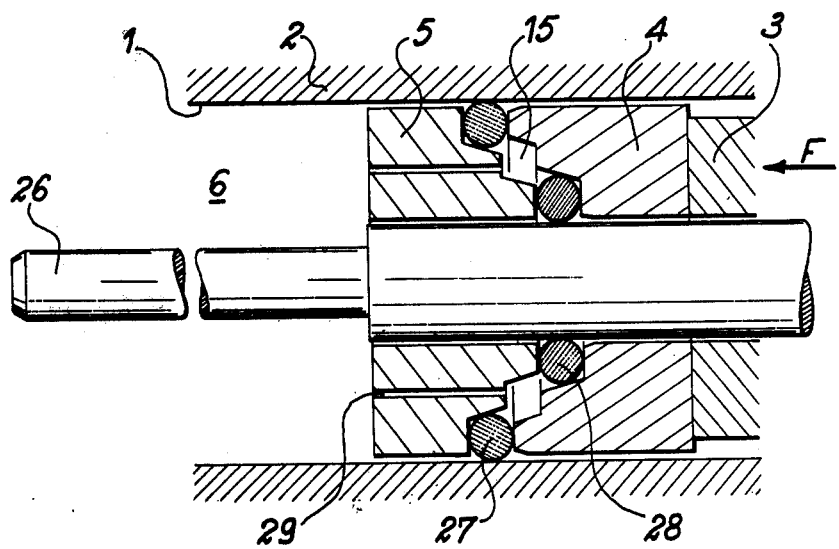
FIG. 5 illustrates a further alternative embodiment

In another alternative embodiment which is illustrated in FIG. 4, the second member 5 is fitted directly with an axial pin 22 having a frusto-conical head 23 which is immobilized within a recess 24 of said member. In this case, the member 5 has one or a number of ducts 25 for providing a communication with the clearance space 15 and for pressure equalization. Finally, in the alternative form shown in FIG. 5, the axial pin 26 is independent of the two members 4 and 5 and is slidably mounted within the ram 3. In this case, the ram makes use of two seals 27 and 28 respectively, said seals being capable of ensuring pressure-tightness on assembly both in the direction of the internal surface 1 of the extrusion chamber 2 in the case of the seal 27 and in the direction of the external surface of the axial pin 26 in the case of the seal 28. The member 5 has at least one communication duct 29 for the flow of lubricant.

Figure 6:
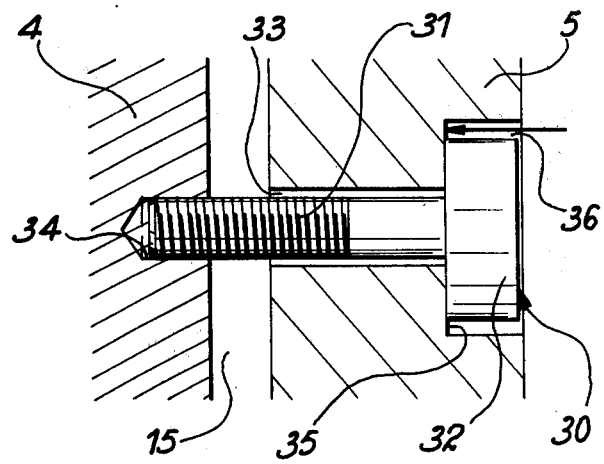
FIGS. 6 and 7 show another form of construction of the means for ensuring pressure equilibrium on each side of the member of the device which is in contact with the lubricant within the extrusion chamber of the press.
Figure 7:
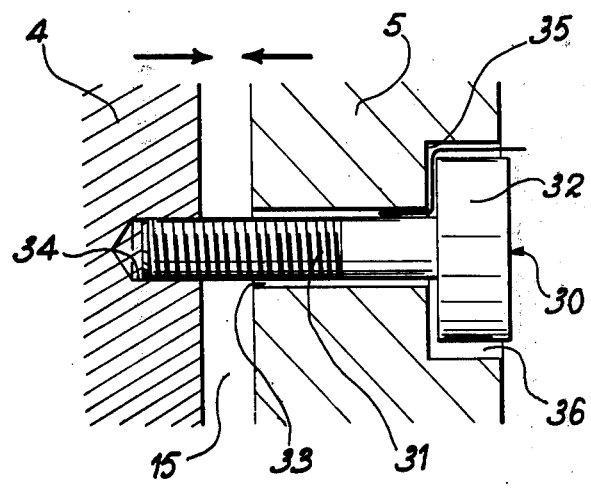

In the foregoing examples, equalization of the pressures on each side of the second compression member of the seal is carried into effect through a narrow duct which is preferably fitted with a calibrated control valve. It is readily apparent that this arrangement is not limitative and can form the subject of many alternative forms and adaptations. Thus, in the example shown in FIGS. 6 and 7, the connection between the two members 4 and 5 is established by means of a screw 30 having a threaded stem 31 and a cylindrical head 32. After passing through a suitable annular clearance of a bore 33 formed in the member 5, the stem 31 is engaged in an internally-threaded bore 34 of the member 4, the connection between the two members being adjusted at the time of assembly within the press chamber so as to ensure that the head 32 of the screw is normally in abutment against the end wall 35 of a recess 36 formed in the member 5 towards the region 6 (as shown in FIG. 6). When thrust is exerted on the member 4 which ensures initial compression of the seal, there takes place a displacement of the stem 31 of the screw 30 and a more limited displacement of the member 5. This has the effect of providing between the head 32 and the end wall 35 of the recess 36 the passageway which is necessary for directing the lubricant towards the clearance space 15 between the members (as shown in FIG. 7).

As can readily be understood and as has already been brought out in the foregoing, the invention is clearly not limited to the examples of construction which have been more especially described with reference to the drawings but extends on the contrary to all alternative forms. In particular, the characterisitics of the sealing device are unrelated to the nature of the extrusion operation to be performed and apply both to extrusion of metal billets and to isostatic compacting of powders to be sintered. The advantages obtained, namely the possible re-use of the seal even after very severe operating conditions, especially at 14 Kbar and at temperatures ranging from room temperature to 1200° C or more and the ease of disassembly by virtue of the deformation limited to the exact value required are maintained in all cases. The only points to be studied and adapted to each particular applications are the material of the seal and if necessary the shape of said seal for the purpose of assembly between the two compression members.

What we claim is:

1. A sealing device for a ram operated extrusion or compacting press having a press chamber, comprising:

first and second members slidably mounted in an opening of the press chamber and serving to close the press chamber, said members being in interengaged relation and having a clearance space therebetween along a common axis, at least one of said members being subjected to the action of the ram;

a plastically deformable seal located between said first and second members in the vicinity of their periphery;

said first and second members being responsive to the action of the ram which exerts a compressive force on said members along the common axis thereof so as to compress within the press chamber an element which is maintained under hydrostatic pressure of a liquid medium or a lubricant, one of said first and second members being in contact with the liquid medium or lubricant;

one of said first and second members being provided with a substantially flat bearing surface of small cross-sectional area, relatively to the overall cross-sectional area of the member, which is applied against the seal and which extends at right angles to the common axis, the other of said first and second members being provided with an inclined bearing face applied against the seal and directed towards the exterior of said other member, the application of said compressive force to said members under the action of the ram being such as to cause initial creep deformation of the seal under pressure; and the member in contact with said liquid medium or lubricant under hydrostatic pressure within the press chamber comprising means for establishing pressure equilibrium within the press chamber and for also establishing pressure equilibrium within the clearance space formed between said first and second members and the seal, said pressure equilibrium establishing means establishing said pressure equilibrium only immediatly after deformation of the seal so as to ensure pressure-tightness between said members and the internal surface of the press chamber.

2. A device according to claim 1, wherein one of said members is in contact with the ram which applies the compressive force and is provided at its periphery with a conical chamfer for limiting creep deformation within the space between the members and the internal surface of the press chamber.

3. A device according to claim 1, wherein the means for establishing pressure equilibrium comprises at least one narrow duct formed through the member which is in contact with the liquid medium or lubricant within the press chamber and a calibrated control valve in communication with said narrow duct.

4. A device according to claim 3 wherein said calibrated control valve is located in said at least one narrow duct for communicating said press chamber wih said clearance space after a predetermined pressure is reached in said clearance space.

5. A device according to claim 1 wherein the means for establishing pressure equilibrium comprises:

a first bore formed in the member which is in contact with the liquid medium or lubricant within the press chamber, said bore terminating in a recess;

the other member having an internally-threaded second bore in alignment with said first bore; and a screw having an elongated stem slidably passing through said first bore and a head connected to said stem and being in abutting contact with at least a portion of the surface of said recess, said stem having a threaded portion which is threadably engaged in said internally-threaded second bore of the other member;

the stem of the screw and said first bore being dimensioned so as to delimit a narrow annular duct for the upward flow of the liquid medium or lubricant towards the clearance space between the two members.

6. A device according to claim 5 wherein said first bore is in the direction of said common axis.

7. A device according to claim 1, wherein the means for establishing pressure equilibrium comprises a bore formed in the member which is in contact with the liquid medium or lubricant within the press chamber; and an elongated member passing through said bore; the elongated member and the bore being dimensioned so as to delimit a narrow annular duct for the upward flow of the liquid medium or lubricant towards the clearance space between the two members.

8. A device according to claim 7, wherein the elongated member is slidably mounted within said bore.

9. A device according to claim 1, wherein the means for establishing pressure equilibrium comprises at least one narrow duct formed through the member which is in contact with the liquid medim or lubricant.

10. A device according to claim 9, wherein one of said members is in contact with the ram which applies the compressive force and is provided at its periphery with a conical chamfer for limiting creep deformation within the space between the members and the internal surface of the press chamber.

11. A device according to claim 1, wherein both of said first and second members have bores therethrough and comprising an elongated member slidably passing through said bores; a further seal located in said clearance space and abutting against said elongated member and being in abutting relationship between said first and second members; and wherein said means for establishing pressure equilibrium is located so as to communicate with a space in said clearance space defined between said seals and said first and second members.

12. A device according to claim 11, wherein said means for establishing pressure equilibrium comprises at least one narrow duct formed through the member which is in contact with the liquid medium or lubricant within the press chamber.

13. A sealing device for a ram operated extrusion or compacting press having a press chamber, comprising:

first and second members slidably mounted in an opening of the press chamber and serving to close the press chamber, said members being in interengaged relation and having a clearance space therebetween along a common axis, at least one of said members being in contact with the ram so as to be subjected to the action of the ram;

a deformable seal located between said first and second members in the vicinity of their periphery;

said first and second members being responsive to the action of the ram which exerts a compressive force on said members along the common axis thereof so as to compress within the press chamber an element which is maintained under hydrostatic pressure of a liquid medium or a lubricant, one of said first and second members being in contact with the liquid medium or lubricant;

one of said first and second members being provided with a substantially flat bearing surface of small cross-sectional area, relative to the overall cross-sectional area of the member, which is applied against the seal and which extends at right angls to the common axis, the other of said first and second members being provided with an inclined bearing face applied against the seal and directed towards the exterior of said other member, the application of said compressive force to said mebers under the action of the ram being such as to cause initial creep deformation of the seal under pressure;

the member in contact with the ram having a conical chamfer at its periphery for limiting creep deformation within the space between the members and the internal surface of the press chamber; and the member in contact with said liquid medium or lubricant under hydrostatic pressure within the press chamber comprising means for establishing pressure equilibrium within the press chamber and for also establishing pressure equilibrium within the clearance space formed between said first and second members and the seal, said pressure equilibrium establishing means establishing said pressure equilibrium only immediately after deformation of the seal so as to ensure pressure-tightness between said members and the internal surface of the press chamber.

14. A device according to claim 13, wherein the means for establishing pressure equilibrium comprises at least one narrow duct formed through the member which is in contact with the liquid medium or lubricant within the press chamber and a calibrated control valve in communication with said narrow duct.

15. A device according to claim 13, wherein the means for establishing pressure equilibrium comprises:
a first bore formed in the member which is in contact with the liquid medium or lubricant within the press chamber, said bore terminating in a recess;
the other member having an internally-threaded second bore alignment with said first bore; and
a screw having an elongated stem slidably passing through said first bore and a head connected to said stem and being in abutting contact with at least a portion of the surface of said recess, said stem having a threaded portion which is threadably engaged in said internally-threaded second bore of the other member;
the stem of the screw and said first bore being dimensioned so as to delimit a narrow annular duct for the upward flow of the liquid medium or lubricant towards the clearance space between the two members.

* * * * *